US012188563B2

(12) United States Patent
Karanian et al.

(10) Patent No.: US 12,188,563 B2
(45) Date of Patent: Jan. 7, 2025

(54) MISTAKE-PROOFING FOR HYDROSTATIC SEAL ASSEMBLIES

(71) Applicant: Raytheon Technologies Corporation, Farmington, CT (US)

(72) Inventors: Caroline A. Karanian, West Harford, CT (US); Conway Chuong, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/128,568

(22) Filed: Mar. 30, 2023

(65) Prior Publication Data
US 2024/0328514 A1    Oct. 3, 2024

(51) Int. Cl.
*F16J 15/34*   (2006.01)
*F01D 11/00*   (2006.01)

(52) U.S. Cl.
CPC .......... *F16J 15/342* (2013.01); *F01D 11/005* (2013.01); *F05D 2240/55* (2013.01)

(58) Field of Classification Search
CPC .... F16J 15/00; F16J 15/16; F16J 15/34; F16J 15/3412; F16J 15/3416; F16J 15/342; F16J 15/3288; F01D 11/00; F01D 11/005; F01D 11/006; F01D 11/008; F05D 2240/00; F05D 2240/55; F05D 2240/56; F05D 2240/57; F05D 2240/58; F05D 2240/581; F05D 2240/59
USPC ........................................................ 277/400
See application file for complete search history.

(56) References Cited

U.S. PATENT DOCUMENTS

| 5,292,138 | A  | * | 3/1994  | Glynn ................... F16J 15/164 415/230 |
| 8,939,710 | B2 | * | 1/2015  | Webb .................... F01D 11/005 415/113 |
| 10,119,474 | B2 | * | 11/2018 | Hyland ................... F01D 25/22 |
| 11,149,651 | B2 | * | 10/2021 | Stoyanov ............. F01D 11/003 |
| 11,287,045 | B2 | * | 3/2022  | McCaffrey ............. F16J 15/445 |

(Continued)

FOREIGN PATENT DOCUMENTS

| EP | 3293360 A1 | * | 3/2018 |
| EP | 3428490 A1 |   | 1/2019 |

(Continued)

OTHER PUBLICATIONS

Extended European Search Report for EP Application No. 24167352.4, dated Aug. 14, 2024, 8 pages.

*Primary Examiner* — Nathan Cumar
(74) *Attorney, Agent, or Firm* — Kinney & Lange, P.A.

(57) ABSTRACT

A seal assembly configured to reduce fluid flow from an axially upstream side of the seal assembly to an axially downstream side of the seal assembly includes a primary seal and a secondary seal assembly disposed at an axially forward end of the primary seal. The secondary seal assembly includes a seal support and a secondary seal. The seal support includes a downstream axial face disposed axially proximate to and facing the primary seal, an upstream axial face opposite the downstream axial face, a body extending from the downstream axial face to the upstream axial face, a first leg extending radially inward from the body, a second leg extending radially inward from the body, and a mistake-proofing protrusion extending from the upstream axial face and in an axially upstream direction.

19 Claims, 8 Drawing Sheets

(56) References Cited

U.S. PATENT DOCUMENTS

| | | | |
|---|---|---|---|
| 11,434,827 B2* | 9/2022 | Chuong | F01D 11/025 |
| 2018/0066533 A1* | 3/2018 | Chuong | F01D 11/025 |
| 2021/0301925 A1* | 9/2021 | Grover | F01D 11/003 |

FOREIGN PATENT DOCUMENTS

| | | | |
|---|---|---|---|
| EP | 3677817 A1 | 7/2020 | |
| EP | 3789589 A1 | 3/2021 | |
| WO | 2020076301 A1 | 4/2020 | |

* cited by examiner

MISTAKE-PROOFING FOR HYDROSTATIC SEAL ASSEMBLIES

BACKGROUND

The present disclosure relates to hydrostatic seal assemblies and, more particularly, to mistake-proofing features for hydrostatic seal assemblies.

Hydrostatic seals use a pressure differential in combination with mechanical resistance to provide a variable-position seal that can adjust to the relative position of an adjacent component, such as an adjacent rotating component. Hydrostatic seals can include one or more secondary seals to maintain the pressure differential used by the primary hydrostatic seal. The secondary seal(s) often need to be loaded against the primary hydrostatic seal in a particular orientation to provide sealing. Failure to assemble the secondary seal(s) in the correct orientation(s) can reduce the overall effectiveness of the secondary seal(s) and, accordingly, can reduce the overall effectiveness of the primary hydrostatic seal.

SUMMARY

An example of a seal assembly configured to reduce fluid flow from an axially upstream side of the seal assembly to an axially downstream side of the seal assembly includes a primary seal and a secondary seal assembly disposed at an axially forward end of the primary seal. The primary seal includes a shoe defining an inner circumferential extent of the primary seal and a structural rim mechanically connected to the shoe and disposed radially outward of the shoe. The secondary seal assembly includes a seal support and a secondary seal. The seal support includes a downstream axial face disposed axially proximate to and facing the primary seal, an upstream axial face opposite the downstream axial face, a body extending from the downstream axial face to the upstream axial face, a first leg extending radially inward from the body, a second leg extending radially inward from the body, and a mistake-proofing protrusion extending from the upstream axial face and in an axially upstream direction. The body partially defines the downstream axial face and the upstream axial face, the first leg defines a remainder of the downstream axial face, and the second leg defines a remainder of the upstream axial face. The first and second legs together define a radial cavity therebetween. The secondary seal extends at least partially into the radial cavity.

An example of a turbine assembly includes a rotating component and a seal assembly according to another example of the present disclosure.

The present summary is provided only by way of example, and not limitation. Other aspects of the present disclosure will be appreciated in view of the entirety of the present disclosure, including the entire text, claims, and accompanying figures.

Figure 1:
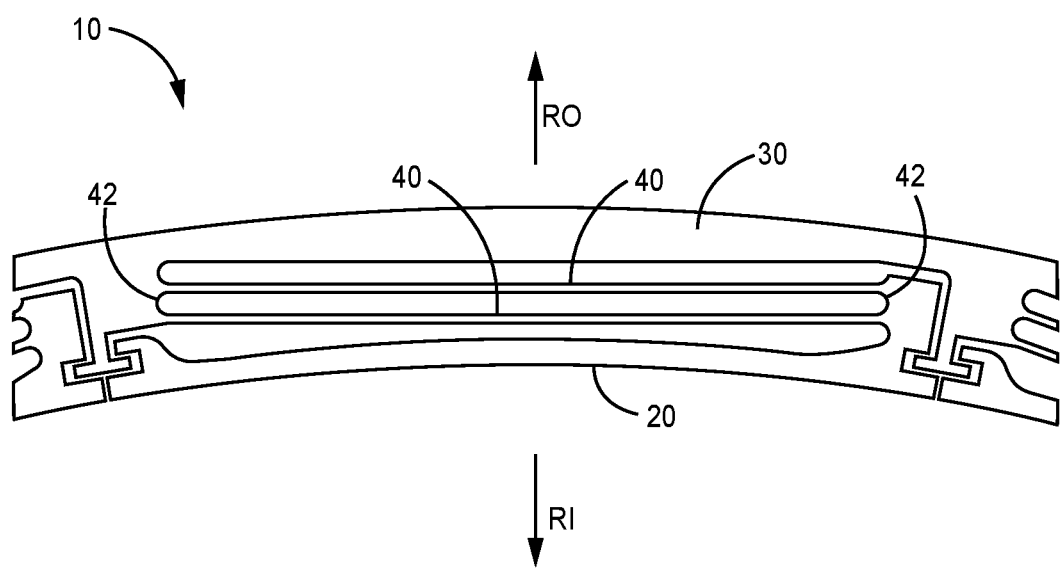
FIG. 1 a front view of an example of a hydrostatic seal.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure describes a secondary seal assembly for a hydrostatic seal assembly. More specifically, the present disclosure describes mistake-proofing features for a hydrostatic seal assembly using a secondary seal assembly. The mistake-proofing features described herein extending axially with respect to the axis of a rotating component sealed by the hydrostatic seal assembly, preventing or reducing the likelihood of incorrect installation of the secondary seal assembly. Further, the secondary seal assemblies described herein allow for increased contact with the seal carrier at lower overall weights as compared to alternative designs, reducing the likelihood of undesirable distortion of the secondary seal assemblies during operation without requiring the use of heavier and/or bulkier secondary seal assemblies.

FIG. 1 is a front-view of hydrostatic seal 10, which is an example of a hydrostatic seal. Hydrostatic seal 10 includes shoe 20, structural rim 30, beams 40, and connecting portions 42. FIG. 1 also includes arrows RI and RO, which indicate radially inward and radially outward directions of hydrostatic seal 10. Hydrostatic seal 10 is generally arcuate and, in some examples, forms an annular structure. Shoe 20 defines the inner circumferential extent of hydrostatic seal 10 and includes one or more seal elements on the radially inner surface of shoe 20 that allow the radially innermost surface of shoe 20 to form a seal against an adjacent surface of a rotating component located radially inboard of shoe 20. Structural rim 30 is a structural element of hydrostatic seal 10 that defines the outer circumferential extent of hydrostatic seal 10. Structural rim 30 is radially outside of shoe 20 (i.e., in direction RO). Beams 40 mechanically connect shoe 20 to structural rim 30 via connecting portions 42 and allow shoe 20 to move radially inward (i.e., in direction RI) and radially outward (i.e., in direction RO) during operation of hydrostatic seal 10. Connecting portions 42 function as spring elements in combination with beams 40 and exert a spring force that resists radial deflection of shoe 20.

In operation, aerodynamic pressures from compressed air along the radially outer surface (i.e., the outer diameter) of a rotating component can apply an aerodynamic force to the radially inner surface of shoe 20. Lower pressure air along the radially outer surface of shoe 20 applies aerodynamic force to the radially outer surface of shoe 20, such that the overall or net aerodynamic force applied to shoe 20 is determined according to the relative air pressure along the radially inner and radially outer surfaces of shoe 20. The spring elements formed by beams 40 and connecting portions 42 apply a spring force that resist radial translation of shoe 20. In operation, as air speed across the seal created by the radially inner surface of shoe 20 increases, the relative air pressure along the radially inner surface of shoe 20. Shoe 20 moves outward due to the differential between the air pressure along the radially inner and radially outer surfaces of shoe 20 until shoe 20 reaches an equilibrium point between the net aerodynamic force and the spring force applied to shoe 20 by beams 40 and connecting portions 42.

Figure 2A:
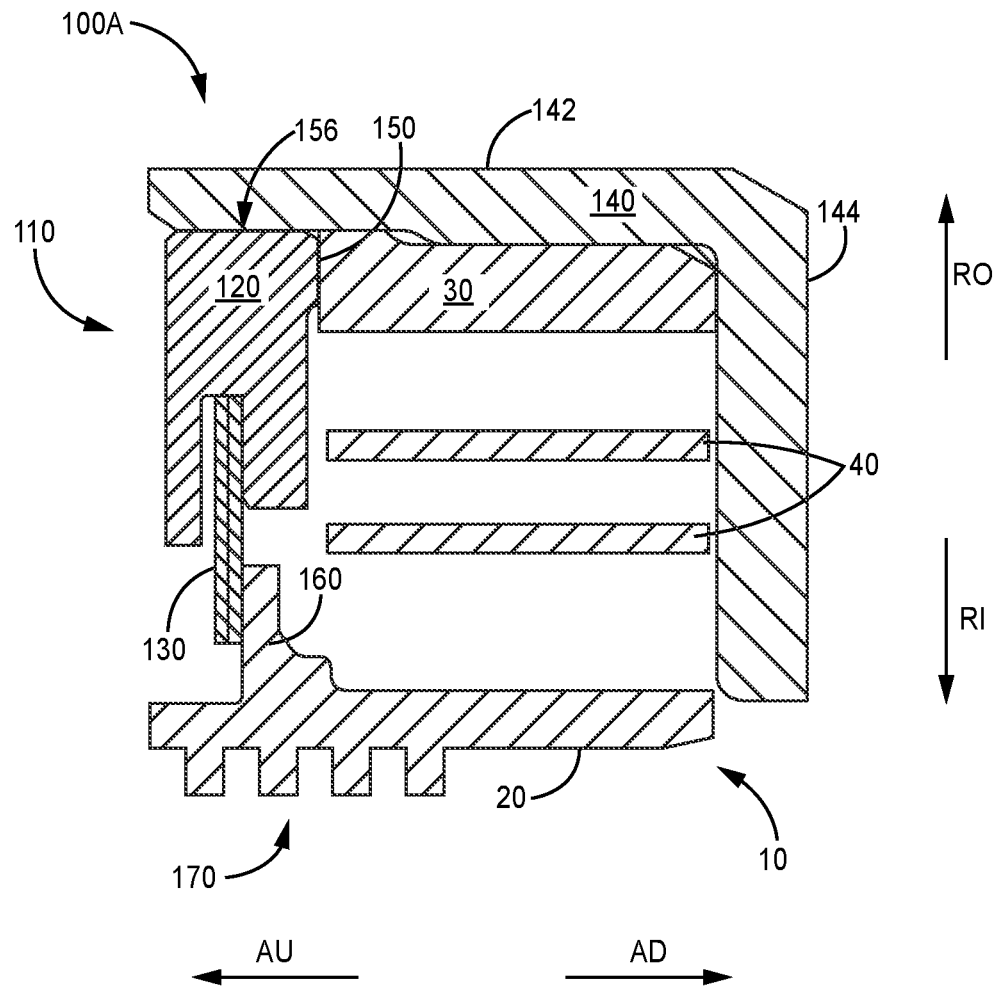
FIG. 2A is a cross-sectional view of an example of the hydrostatic seal of FIG. 1 including a secondary seal.

FIG. 2A is cross-sectional views of seal assembly 100A, which is an example of a hydrostatic seal assembly and includes hydrostatic seal 10 and secondary seal assembly 110. Secondary seal assembly 110 includes seal support 120 and secondary seal 130. Seal assembly 100A also includes carrier 140, which includes axially extending arm 142 and radially extending arm 144. Seal support 120 includes spacing rim 150 and forms contact patch 156 against carrier 140. FIG. 2A also depicts seat 160 and seal teeth 170 of hydrostatic seal 10. Arrows RO and RI depict radially outer and radially inner directions, respectively, and arrows AU and AD depict axially upstream and axially downstream directions, respectively. In the depicted example, hydrostatic seal 10 is a primary seal that forms a seal against a rotating component located radially inward of seal teeth 170 and the radially inner surface of shoe 20, while secondary seal assembly 110 functions to reduce airflow across the radially inner surface of shoe 20 during operation to enable the formation of an air pressure differential across the radially inner and radially outer surfaces of shoe 20.

Carrier 140 locates and positions seal support 120 adjacent to axially extending arm 142 of carrier 140 extends axially from a position axially downstream of the axially downstream end of structural rim 30 to a position axially upstream of the axially upstream end of structural rim 30, and the radially inner surface of axially extending arm 142 contacts radially outer surfaces of structural rim 30 and seal support 120. Radially extending arm 144 extends radially inward of the axially downstream end of axially extending arm 142. Radially extending arm 144 extends to a point proximate to the axially downstream end of seat 160. The axially upstream face of radially extending arm 144 is spaced axially from the axially downstream ends of beams 40 such that radially extending arm 144 does not impede the movement of beams 40 during operation of seal assembly 100A. Seal assembly 100A can be assembled by first loading hydrostatic seal 10 into carrier 140 and subsequently by installing secondary seal assembly 110 into carrier 140 against the axially upstream face of hydrostatic seal 10.

Seal support 120 radially and axially locates secondary seal 130 against seat 160 of shoe 20. Specifically, seal support 120 radially and axially positions a radially inner portion of the axially downstream (i.e., in axially downstream direction AD) face of secondary seal 130 against the axially upstream (i.e., in axially upstream direction AU) face of seat 160, thereby forming a seal that reduces axial flow of air into the space between shoe 20 and structural rim 30. Seal support 120 is sized to position secondary seal 130 against seat 160 such that the sealing faces of secondary seal 130 and seat 160 are generally parallel when secondary seal 130 contacts seat 160. In the depicted example, both seal 130 and seat 160 and the sealing faces thereof extend generally parallel to directions RI, RO. The length radial contact between secondary seal 130 and seat 160 is selected such that the seal between secondary seal 130 and seat 160 is formed at all expected positions of shoe 20 (e.g., at all expected radial positions) relative to carrier 140 during operation of seal assembly 100A.

Seal support 120 includes spacing rim 150 to space the axially downstream face of seal support 120 from the axially upstream ends of beams 40, such that seal support does not impede the movement of beams 40 during operation of seal assembly 100A. The radially outer surface of seal support 120 forms contact patch 156 with the radially inner surface of axially extending arm 142 of carrier 140. Spacing rim 150 extends perpendicular to directions AD, AU and parallel to directions RI, RO. Secondary seal 130 is an arcuate seal and, in some examples, secondary seal 130 is an annular seal. In all examples, secondary seal 130 is to be geometrically complementary to and abuts hydrostatic seal 10.

Figure 2B:
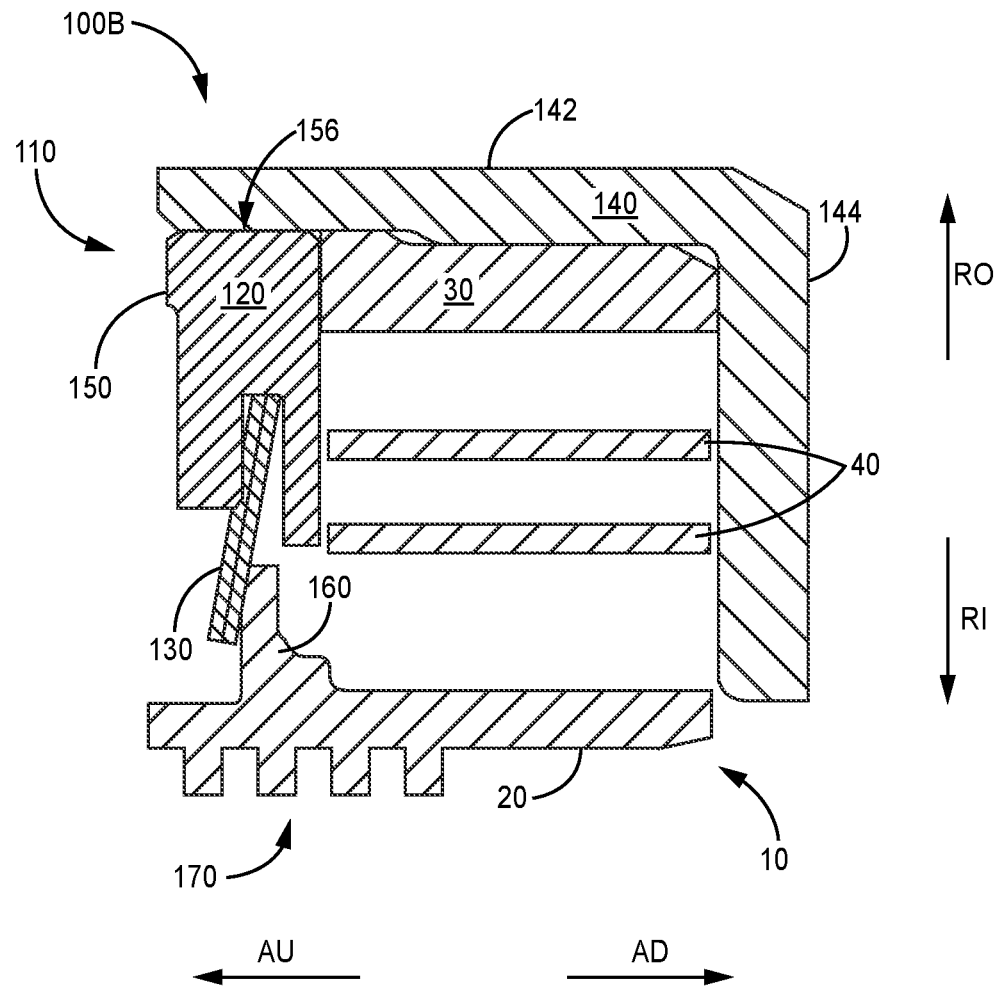
FIG. 2B is a cross-sectional view of the hydrostatic seal of FIG. 1 including the secondary seal of FIG. 2A in an incorrect orientation.

When installed in the orientation depicted in FIG. 2A, the axially downstream end of spacing rim 150 abuts the axially upstream face of structural rim 30 to correctly position secondary seal 130 against seat 160. FIG. 2B depicts seal assembly 100B, which is substantially the same as seal assembly 100A but includes secondary seal assembly 110 installed in an incorrect orientation. The orientation depicted of secondary seal assembly 110 in seal assembly 100B is the axial reverse of the orientation of secondary seal assembly 110 in seal assembly 100A. When secondary seal assembly 110 is inserted into carrier 140 in the orientation depicted in FIG. 2B, secondary seal 130 is misaligned with seat 160 and contact with seat 160 causes secondary seal 130 to tilt such that the sealing faces of secondary seal 130 and seat 160 are not parallel. The tilted orientation of secondary seal 130 in seal assembly 100B causes secondary seal 130 to have reduced contact with seat 160 as compared to the radially aligned orientation of secondary seal 130 in seal assembly 100A. Accordingly, the orientation of secondary seal 130 in seal assembly 100B results in an inferior seal as compared to the orientation of secondary seal 130 in seal assembly 100A.

Figure 3A:
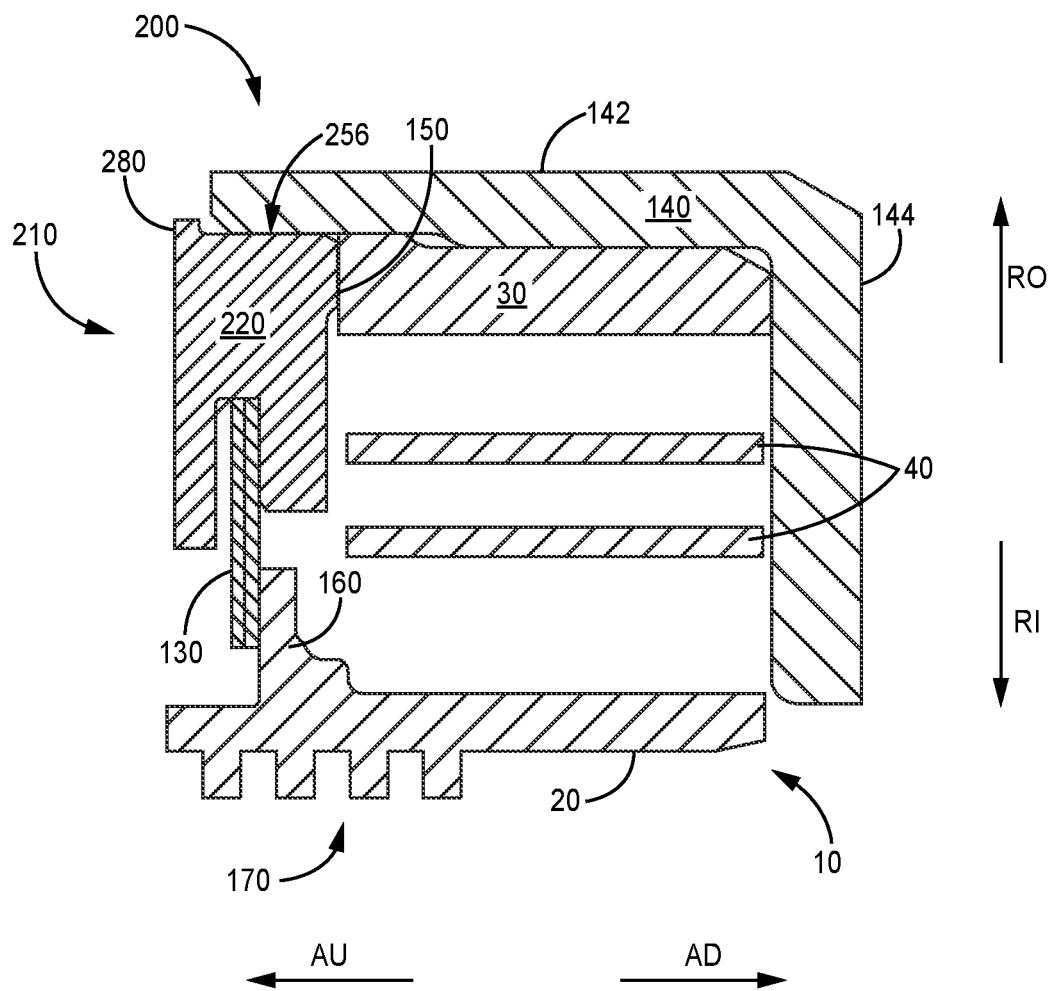
FIG. 3A is a cross-sectional view of an example of the hydrostatic seal of FIG. 1 including a secondary seal having a mistake-proofing feature.

FIG. 3A is a cross-sectional depiction of seal assembly 200, which is an example of a seal assembly including a secondary seal having a mistake-proofing feature. Seal assembly 200 is substantially similar to seal assembly 100A, but includes seal support 220 rather than seal support 120. Seal support 220 is substantially similar to seal support 120, but includes mistake-proofing feature 280 and forms contact patch 256 with carrier 140 rather than contact patch 156. Mistake-proofing feature 280 extends from the radially outer surface of seal support 220 between the axially upstream end of seal support 220 and the axially upstream end of contact patch 256.

While the geometry of seal support 120 allows seal support 120 to be fully inserted into carrier 140 in an incorrect orientation (as is shown in FIG. 2B), the geometry of seal support 220 prevents seal support 220 from being fully inserted into carrier 140, thereby preventing incorrect installing of seal support 220 and reducing damage to the components of seal assembly 200 that can result from incorrect installation of seal support 220. In particular, mistake-proofing feature 280 contacts the axially upstream end of axially extending arm 142 of carrier 140 when installation of seal support 220 in the axially reverse, incorrect orientation is attempted, thereby preventing seal support 220 from being inserted into carrier 140 in the incorrect orientation.

Figure 3B:
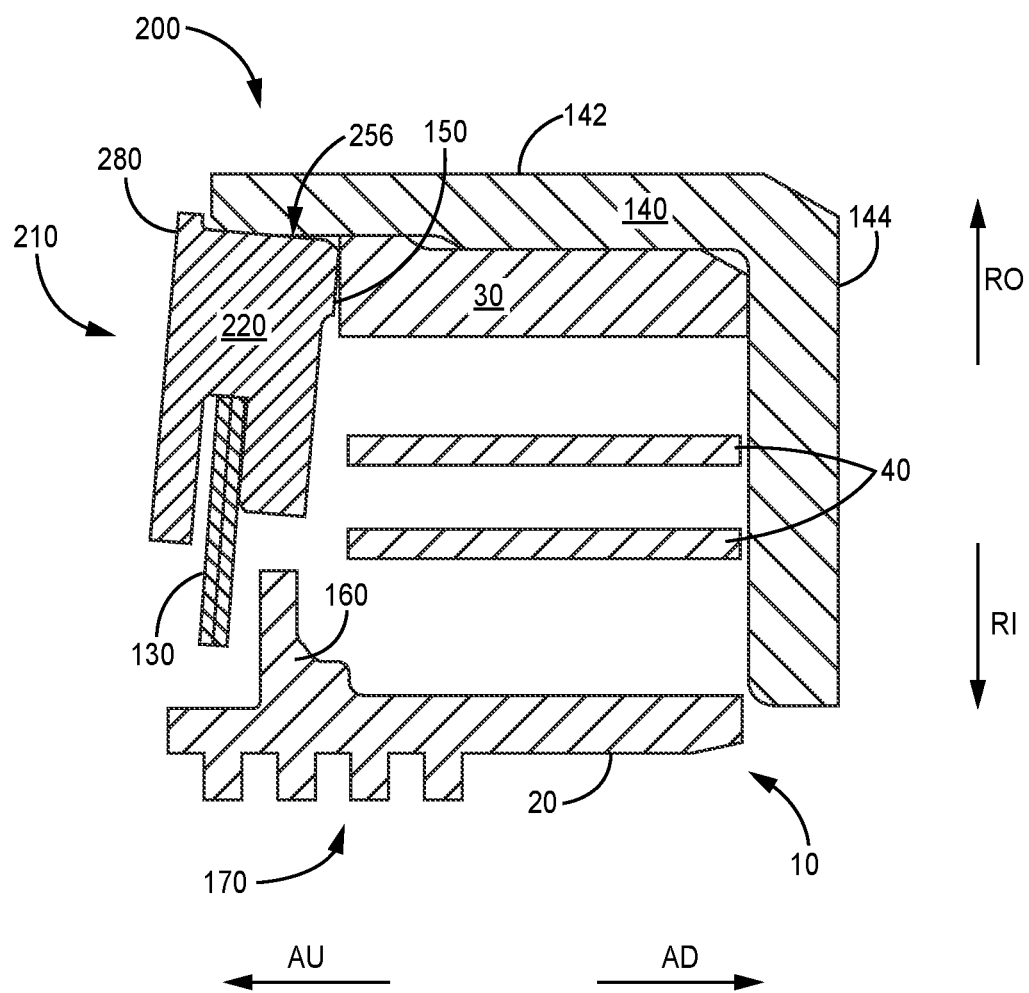
FIG. 3B is another cross-sectional view of the hydrostatic seal of FIG. 1 including the secondary seal of FIG. 3A.

However, contact patch 256 has a shorter axial length than contact path 156 of seal support 120. The shorter contact patch 256 of seal support 220 allows seal support 220 to flex when installed in carrier 140. More specifically, the length of contact patch 256 is less than the axial length of seal support 220 or is otherwise not equal or not substantially equal in length to the axial length of seal support 220. Accordingly, contact patch 256 does not allow axially extending arm 142 of carrier 140 to support the entire length of seal support 220 and seal support consequently able to flex when disposed in carrier 140. FIG. 3B depicts seal support 220 in a flexed position. Specifically, in FIG. 3B, seal support 220 has rotated relative to carrier 140 and hydrostatic seal 10 such that seal 130 does not contact seat 160. Accordingly, in FIG. 3B, seal support 220 does not significantly reduce the flow of air across seal 130 and into the area of hydrostatic seal 10 between structural rim 30 and shoe 20, reducing or preventing the formation of the air pressure differential required for proper function of hydrostatic seal 10. The incidence of distortion can be slightly decreased by increasing the length of contact patch 256, but increasing the length of contact patch 256 increases the total axial length of seal support 220 and, consequently, also increases the total weight and size of seal assembly 200, and further can require other axially adjacent components to be resized or repositioned to accommodate the increased size of seal assembly 200.

Figure 4A:
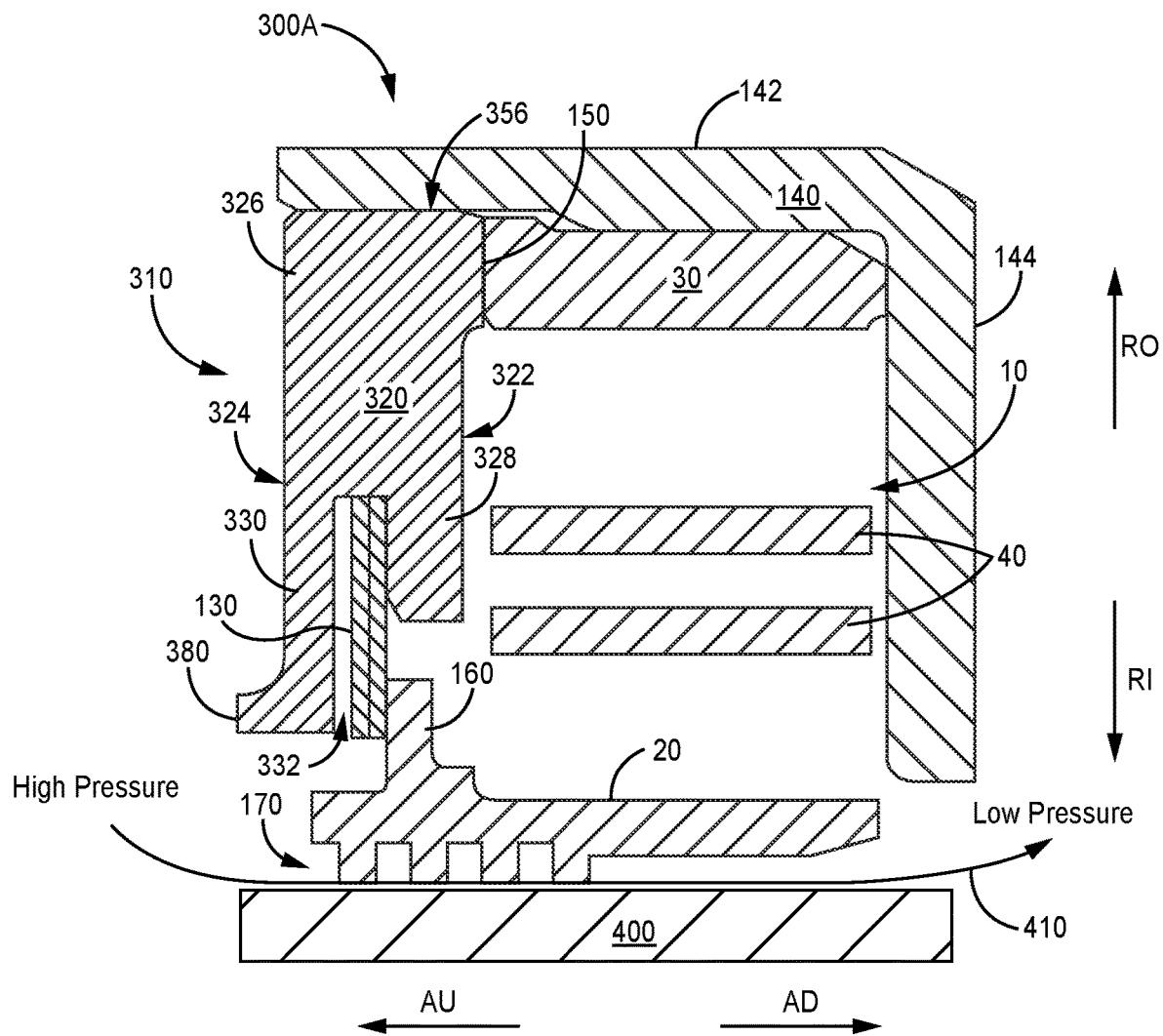
FIG. 4A is a cross-sectional view of an example of the hydrostatic seal of FIG. 1 including a secondary seal having an alternative mistake-proofing feature.
Figure 4B:
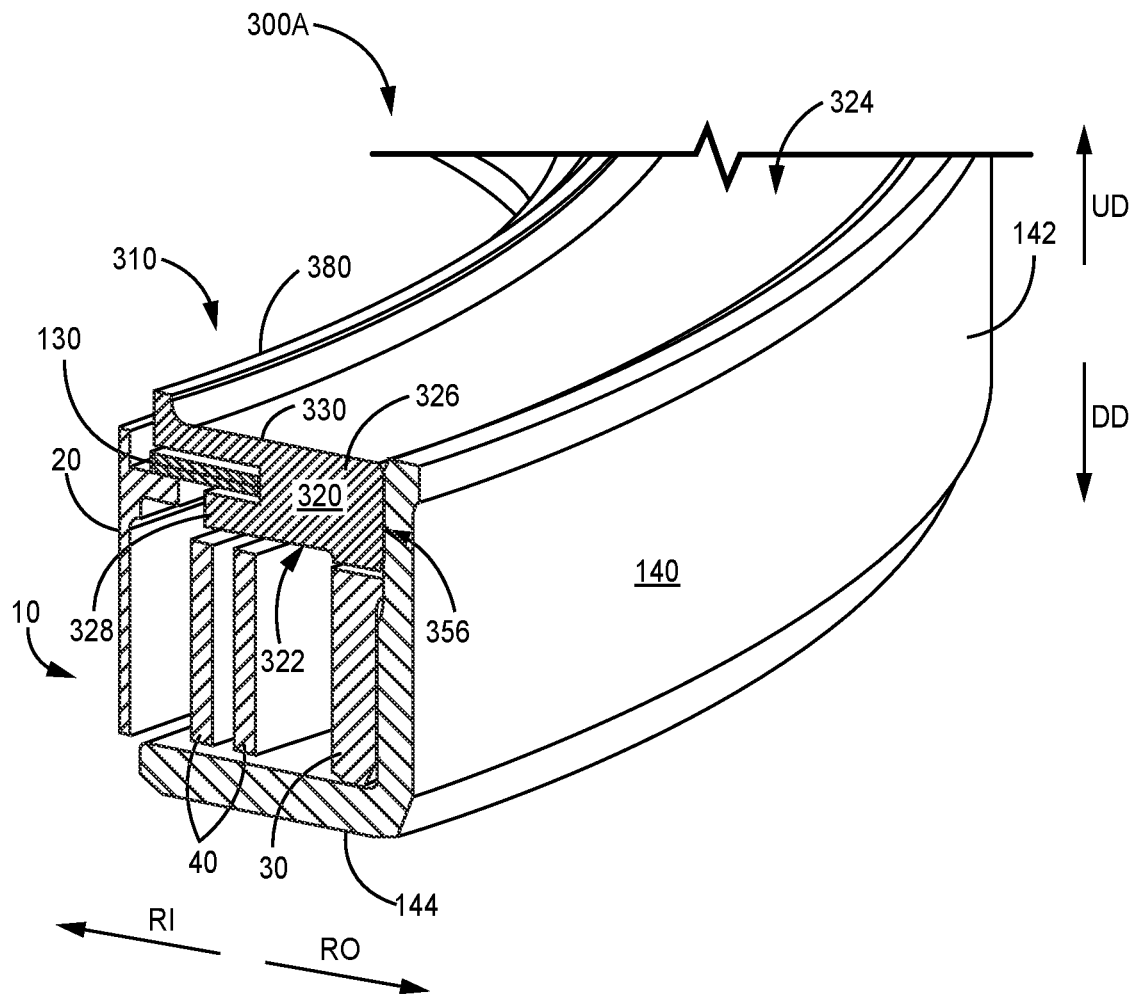
FIG. 4B is an isometric view of the example of the hydrostatic seal of FIG. 1 including the secondary seal of FIG. 4A.

FIGS. 4A-B depict seal assembly 300A, which is a seal assembly including an alternative mistake-proofing feature. FIG. 4A is a cross-sectional view of seal assembly 300A and FIG. 4B is an isometric view of seal assembly 4A. FIGS. 4A-B will be discussed together herein. Seal assembly 300A is substantially similar to seal assemblies 100A, 200, but includes secondary seal assembly 310. Secondary seal assembly 310 includes seal support 320 to house and locate secondary seal 130. Seal support 320 includes spacing rim 150, axial face 322, axial face 324, body 326, leg 328, and leg 330, and defines radial cavity 332. FIG. 4A also depicts rotating component 400, which is a rotating component against which hydrostatic seal 10 can form a primary seal. Rotating component 400 is included in FIG. 4A for clarity and can be, for example, a turbine component or another rotating component of a gas turbine engine, among other options.

As depicted in FIG. 4A, air axially upstream of seal assembly 300A is at a higher pressure than the air that is axially downstream of seal assembly 300A. The radially inner ends of seal teeth 170 are adjacent the radially outer surface of rotating component 400, restricting the flow of air therethrough. Carrier 140 includes one or more gaps that allow air from the low-pressure side of seal assembly 300A to flow into the inner volume of hydrostatic seal 10 and provide aerodynamic force to the radially outer surface of shoe 20, as described previously herein.

Secondary seal assembly 310, including secondary seal 130, is located radially outside of shoe 20, such that an inner radius of secondary seal 130 is greater than the inner radius of shoe 20. In the depicted example, seal assembly 300A is annular, such that both hydrostatic seal 10 and secondary seal assembly 310 are annular structures. However, in other examples, the components of seal assembly 300A can have a generally arcuate but non-annular structure or any other suitable structure.

Body 326 forms the radially outer portion of seal support 320 and partially defines both axial face 322 and axial face 324. Leg 328 extends from a radially inner portion of the axially downstream end of seal support 320 (i.e., axial face 322 in FIGS. 4A-B) such that the axially downstream face of leg 328 is aligned with axial face 322. Leg 330 extends from a radially inner portion of the axially upstream end of seal support 320 (i.e., axial face 324 in FIGS. 4A-B) such that the axially downstream face of leg 330 is aligned with axial face 324. Leg 328 and leg 330 define the remainder of axial face 322 and axial face 324, respectively, that is not defined by body 326. Leg 328 and leg 330 together define radial cavity 332, which extends axially between the axially downstream face of leg 330 and the axially upstream face of leg 328 inward to the radially innermost surface of body 326.

Spacing rim 150 extends away from an axially downstream end of body 326 and contacts an axially upstream end of structural rim 30 when secondary seal assembly 310 is installed in the correct orientation in carrier 140. Spacing rim 150 extends from a radially outermost portion of body 326 and forms a continuous rim spanning the arcuate length of seal assembly 300A. However, in other examples, spacing rim 150 can be positioned a different location based on the relative positions of the components of hydrostatic seal 10 and further can be formed of one or more discrete or discontinuous elements (e.g., one or more separate protrusions, rim segments, etc.).

Mistake-proofing protrusion 380 extends in an axially upstream direction from the axially upstream face of leg 330 (i.e., axial face 324), such that the most axially upstream point of mistake-proofing protrusion 380 is the most axially upstream point of seal support 320. Mistake-proofing protrusion 380 is also located at the radially innermost point of leg 330, such that the radially inner surface of mistake-proofing protrusion 380 is aligned with the radially inner surface of leg 330. As depicted in FIGS. 4A-B, leg 328 and leg 330 have differing radial lengths. The radial length of leg 328 is selected such that the radially innermost point of leg 328 does not contact the radially outermost point of seat 160 when seal assembly 310 is installed in carrier 140 (i.e., such that leg 328 does not axially overlap seat 160). The radial length of leg 330 is longer than the length of leg 328 and a radially inner portion of leg 330 axially overlaps with seat 160. As referred to herein, components can be considered to radially overlap when the components are disposed at a common location along axis A-A such that a radial line extending orthogonally from axis A-A passes through each of those radially overlapping components. Similarly, components can be considered to axially overlap when the components are disposed at a common radial position relative to axis A-A, such that an axial line extending parallel to axis A-A passes through each axially overlapping component. While leg 328 and leg 330 are depicted in FIGS. 4A-B as having differing radial lengths, in other examples, leg 328 and leg 330 can have the same radial length. In yet further examples, leg 328 can have a shorter radial length than leg 330.

Figure 4C:
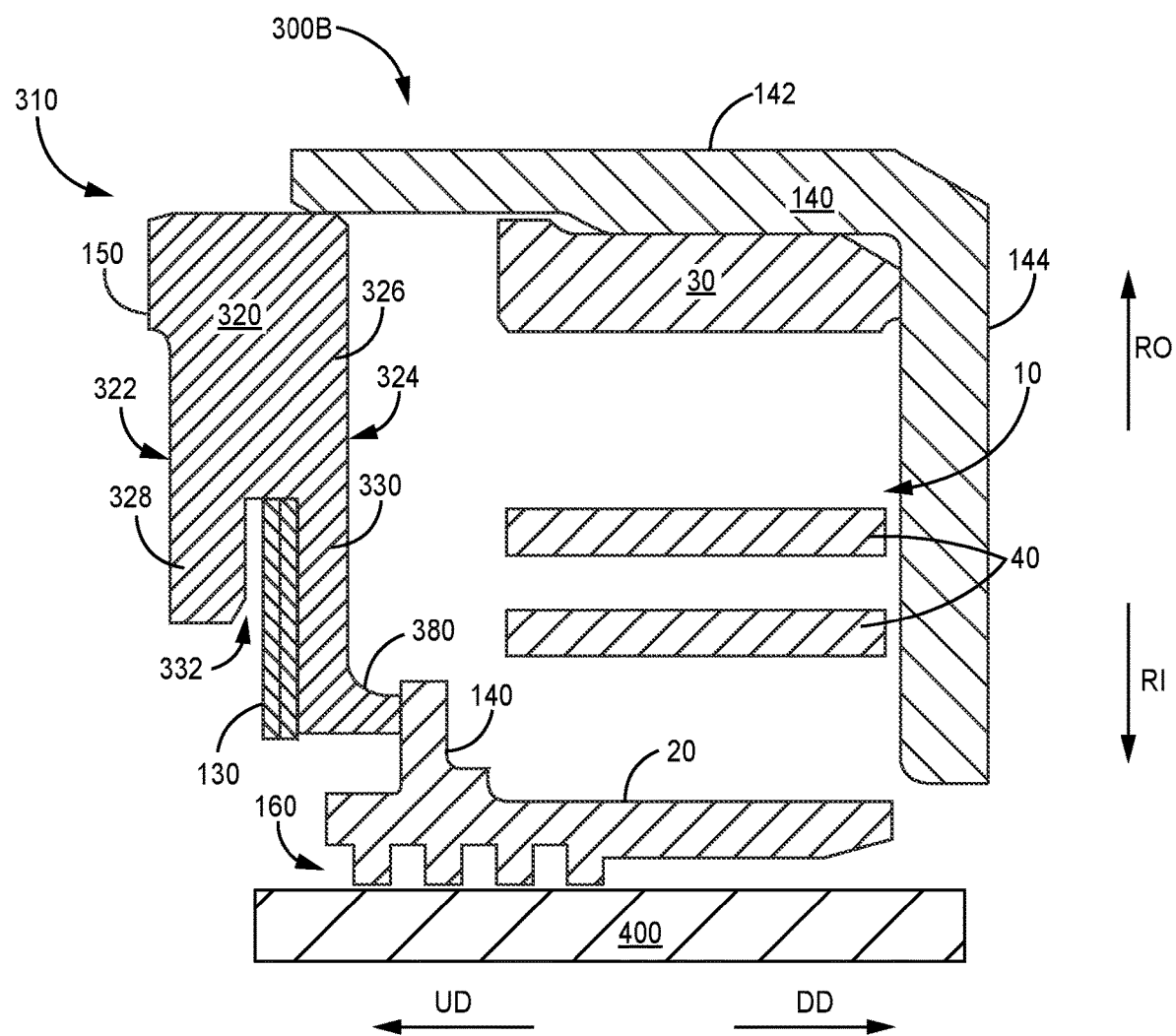
FIG. 4C is a cross-sectional view of the hydrostatic seal of FIG. 1 including the secondary seal of FIG. 4A in an incorrect orientation.

FIG. 4C depicts seal assembly 300B, which is substantially the same as seal assembly 300A but includes seal support 320 in the axially reversed, incorrect orientation. As shown in FIG. 4C, the radial length of leg 330 and the position of mistake-proofing protrusion 380 on leg 330 allows mistake-proofing protrusion 380 to contact seat 160 when seal support 320 is inserted into carrier 140 in the incorrect orientation. However, in other examples, mistake-proofing protrusion 380 can be repositioned along axial face 324 to contact another feature or element of hydrostatic seal 10 when inserted into carrier in the incorrect orientation.

As depicted in FIGS. 4A-C, mistake-proofing protrusion 380 forms a continuous lip that extends along the entire arcuate length of seal support 320. However, in other examples, seal support 320 can be discontinuous, such that seal support 320 is formed of multiple separate elements extending from leg 330 (e.g., multiple protrusions, lip segments, etc.). Further, in the depicted example, mistake-proofing protrusion 380 includes a concave fillet or radiused shoulder extending between the radially outer edge of mistake-proofing protrusion 380 and axial face 324. While mistake-proofing protrusion 380 is shown as being integral with seal support 320 (i.e., with leg 330 in the depicted example), in other examples seal support 320 can be formed by one or more structures affixed to the upstream surface of seal support 320. For example, mistake-proofing protrusion can be formed of one or more pins attached to and extending from leg 330.

The radially outer face of seal support 320 forms contact patch 356 with the radially inner face of axially extending arm 142 of carrier 140. Contact patch 356 has a longer axial length than contact patch 256 of seal support 220 and has substantially the same axial length seal support 320. Because of the axial length of contact patch 356, seal support 320 is not as likely to warp, distort, and/or roll into a conformation that disrupts the seal between secondary seal 130 and seat 160 as is seal support 220. More specifically, as contact patch 356 has substantially the same axial length as seal support 320, axially extending arm 142 of carrier 140 is able to provide sufficient support to seal support 320 and reduce the likelihood that seal support 320 warps, distorts, rolls, or otherwise flexes into an undesirable conformation.

The use of an axially extending mistake-proofing feature, such as mistake-proofing protrusion 380, rather than a radially extending mistake-proofing feature on a seal support for a hydrostatic seal assembly confers a number of advantages. The use of an axially extending mistake-proofing feature can reduce the of likelihood warping, rolling, and/or other distortions of the secondary seal assembly than secondary seal systems using a radially extending mistake-proofing feature, as an axially-extending mistake-proofing feature allows the contact patch between the carrier and the seal support to be similar in axial length to the axial length of the seal support. Further, the use of an axially-extending mistake proofing feature allows for mistake-proofing during assembly of hydrostatic seal systems including secondary seal assemblies. Further, reducing the incidence of distortion of a secondary seal assembly having a radially extending mistake-proofing feature requires the overall size of the secondary seal assembly to be substantially increased. Secondary seal assemblies using an axially extending mistake-proofing feature can accordingly have a lower overall weight than secondary seal assemblies using a radially extending mistake-proofing feature while still reducing the incidence of secondary seal distortions. The lower overall weight of the secondary seal assemblies having axially extending mistake-proofing features disclosed herein confers a number of advantages. For example, where the hydrostatic seal assembly is used to seal a rotating engine component, such as a rotating component of a gas turbine engine, lower weight components can advantageously increase fuel economy or vehicle maneuverability, among other options.

Discussion of Possible Embodiments

An embodiment of a seal assembly configured to reduce fluid flow from an axially upstream side of the seal assembly to an axially downstream side of the seal assembly includes, among other possible options, a primary seal and a secondary seal assembly disposed at an axially forward end of the primary seal. The primary seal comprises a shoe defining an inner circumferential extent of the primary seal and a structural rim mechanically connected to the shoe and disposed radially outward of the shoe. The secondary seal assembly comprises a seal support and a secondary seal. The seal support comprises a downstream axial face disposed axially proximate to and facing the primary seal, an upstream axial face opposite the downstream axial face, a body extending from the downstream axial face to the upstream axial face, the body partially defining the downstream axial face and the upstream axial face, a first leg extending radially inward from the body and defining a remainder of the downstream axial face, a second leg extending radially inward from the body and defining a remainder of the upstream axial face, wherein the first and second legs together define a radial cavity therebetween, and a mistake-proofing protrusion extending from the upstream axial face and in an axially upstream direction. The secondary seal extends at least partially into the radial cavity.

The seal assembly of the preceding paragraph can optionally include, additionally and/or alternatively, any one or more of the following features, configurations and/or additional components:

A further embodiment of the foregoing seal assembly, wherein the seal support further comprises a spacing rim extending in an axially downstream direction from the downstream axial face toward the structural rim.

A further embodiment of any of the foregoing seal assemblies, wherein the spacing rim extends from the body.

A further embodiment of any of the foregoing seal assemblies, wherein an axially downstream end of the spacing rim contacts an axially upstream face of the structural rim.

A further embodiment of any of the foregoing seal assemblies, wherein the spacing rim extends away from the body at a radially outermost portion of the body.

A further embodiment of any of the foregoing seal assemblies, wherein the mistake-proofing protrusion extends away from the second leg.

A further embodiment of any of the foregoing seal assemblies, wherein the mistake-proofing protrusion extends away from a radially innermost portion of the second leg.

A further embodiment of any of the foregoing seal assemblies, wherein the first leg has a first radial length and the second leg has a second radial length.

A further embodiment of any of the foregoing seal assemblies, wherein the second radial length is greater than the first radial length.

A further embodiment of any of the foregoing seal assemblies, and further comprising a seat extending radially inward from the shoe, the seat forming a seal with a radially inner portion of the secondary seal.

A further embodiment of any of the foregoing seal assemblies, wherein the an axially upstream face of the seat forms the seal with an axially downstream face of the secondary seal.

A further embodiment of any of the foregoing seal assemblies, wherein the seat is disposed axially downstream of an axially upstream end of the shoe.

A further embodiment of any of the foregoing seal assemblies, wherein the secondary seal and the primary seal are annular structures.

A further embodiment of any of the foregoing seal assemblies, wherein the secondary seal assembly is an arcuate segment geometrically complementary to and abutting the primary seal.

A further embodiment of any of the foregoing seal assemblies, wherein an inner radius of the secondary seal is greater than an inner radius of the primary seal.

A further embodiment of any of the foregoing seal assemblies, and further comprising a carrier, the carrier comprising a radially extending portion adjacent to and contacting an axially downstream end of the primary seal and an axially extending portion that extends in an axially upstream direction from a radially outer end of the radially extending portion, wherein a radially inner surface of the axially extending portion contacts a radially outer face of the outer rim and a radially outer face of the seal support.

A further embodiment of any of the foregoing seal assemblies, wherein the primary seal further comprises a beam that mechanically connects the seal to the structural rim.

An embodiment of a turbine assembly includes, among other possible options, a rotating component and a seal assembly of any of the foregoing seal assemblies, wherein an inner circumferential extent of the shoe is positioned proximate an outer circumferential extent of the rotating component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly configured to reduce fluid flow from an axially upstream side of the seal assembly to an axially downstream side of the seal assembly, the seal assembly comprising:
   a primary seal comprising:
      a shoe defining an inner circumferential extent of the primary seal; and
      a structural rim mechanically connected to the shoe and disposed radially outward of the shoe;
   a secondary seal assembly disposed at an axially forward end of the primary seal, the secondary seal assembly comprising:
      a seal support comprising:
         a downstream axial face disposed axially proximate to and facing the primary seal;
         an upstream axial face opposite the downstream axial face;
         a body extending from the downstream axial face to the upstream axial face, the body partially defining the downstream axial face and the upstream axial face;
         a first leg extending radially inward from the body and defining a remainder of the downstream axial face;
         a second leg extending radially inward from the body and defining a remainder of the upstream axial face, wherein the first and second legs together define a radial cavity therebetween; and
      a protrusion extending from the upstream axial face and in an axially upstream direction, the protrusion configured for mistake-proof installation of the seal support; and
      a secondary seal extending at least partially into the radial cavity.

2. The seal assembly of claim 1, wherein the seal support further comprises a spacing rim extending in an axially downstream direction from the downstream axial face toward the structural rim.

3. The seal assembly of claim 2, wherein the spacing rim extends from the body.

4. The seal assembly of claim 3, wherein an axially downstream end of the spacing rim contacts an axially upstream face of the structural rim.

5. The seal assembly of claim 3, wherein the spacing rim extends away from the body at a radially outermost portion of the body.

6. The seal assembly of claim 5, wherein the protrusion extends away from the second leg.

7. The seal assembly of claim 6, wherein the protrusion extends away from a radially innermost portion of the second leg.

8. The seal assembly of claim 1, wherein the first leg has a first radial length and the second leg has a second radial length.

9. The seal assembly of claim 8, wherein the second radial length is greater than the first radial length.

10. The seal assembly of claim 1, and further comprising a seat extending radially outward from the shoe, the seat forming a seal with a radially inner portion of the secondary seal.

11. The seal assembly of claim 10, wherein the axially upstream face of the seat abuts an axially downstream face of the secondary seal to form the seal.

12. The seal assembly of claim 10, wherein the seat is disposed axially downstream of an axially upstream end of the shoe.

13. The seal assembly of claim 1, wherein the secondary seal and the primary seal are annular structures.

14. The seal assembly of claim 13, wherein the secondary seal assembly is an arcuate segment geometrically complementary to and abutting the primary seal.

15. The seal assembly of claim 13, wherein an inner radius of the secondary seal is greater than an inner radius of the primary seal.

16. The seal assembly of claim 1, and further comprising a carrier, the carrier comprising:
   a radially extending portion adjacent to and contacting an axially downstream end of the primary seal; and
   an axially extending portion that extends in an axially upstream direction from a radially outer end of the radially extending portion, wherein a radially inner surface of the axially extending portion contacts a radially outer face of the structural rim and a radially outer face of the seal support.

17. The seal assembly of claim 1, wherein the primary seal further comprises a beam that mechanically connects the seal to the structural rim.

18. A turbine assembly, the turbine assembly comprising:
   a rotating component; and
   the seal assembly of claim 1, wherein an inner circumferential extent of the shoe is positioned proximate an outer circumferential extent of the rotating component.

19. The seal assembly of claim 1, wherein the protrusion extends axially upstream the primary seal.

* * * * *